United States Patent
Bathiche

(10) Patent No.: US 7,403,190 B2
(45) Date of Patent: *Jul. 22, 2008

(54) CONTEXT SENSITIVE LABELS FOR A HARDWARE INPUT DEVICE

(75) Inventor: Steven N. Bathiche, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/556,409

(22) Filed: Nov. 3, 2006

(65) Prior Publication Data

US 2007/0052681 A1 Mar. 8, 2007

Related U.S. Application Data

(63) Continuation of application No. 10/630,937, filed on Jul. 31, 2003, now Pat. No. 7,133,030.

(51) Int. Cl.
*G09G 5/00* (2006.01)
(52) U.S. Cl. .................. 345/170; 345/76; 345/156; 345/168; 345/171
(58) Field of Classification Search .......... 345/170, 345/168, 171, 156, 87
See application file for complete search history.

(56) References Cited

U.S. PATENT DOCUMENTS

| | | | |
|---|---|---|---|
| 4,775,964 A | 10/1988 | Alessio et al. | |
| 5,703,436 A | 12/1997 | Forrest et al. | |
| 5,912,660 A | 6/1999 | Gouzman et al. | |
| 6,056,195 A | 5/2000 | Spain | |
| 6,278,441 B1 | 8/2001 | Gouzman et al. | |
| 6,753,830 B2 * | 6/2004 | Gelbman | 345/55 |
| 6,824,321 B2 | 11/2004 | Ward et al. | |
| 6,886,864 B2 | 5/2005 | Nelson et al. | |
| 7,176,991 B2 * | 2/2007 | Mitsui et al. | 349/61 |
| 2003/0174072 A1 * | 9/2003 | Salomon | 341/22 |
| 2004/0036632 A1 | 2/2004 | Ford | |
| 2004/0253973 A1 | 12/2004 | Nguyen et al. | |

OTHER PUBLICATIONS

Schwartz, B.K. "The analog display services interface," Journal: IEEE Communications Magazine vol. 31, No. 4, pp. 70-75, Apr. 1993.
Ashkenzay, D., "Computer Mouse for the Blind: A new computer mouse for the visually impaired puts computer programs and graphics at their fingertips," Israel Magazine-On-Web, Jun. 2001, http://www.mfa/gov.il/mfa/go.asp? MFAH0k580.

* cited by examiner

*Primary Examiner*—Richard Hjerpe
*Assistant Examiner*—Leonid Shapiro
(74) *Attorney, Agent, or Firm*—Merchant & Gould P.C.

(57) ABSTRACT

A method and apparatus for hardware input devices provides context sensitive labels which can change according to an application running on a computer and/or the function assigned to an input element. An illustrative implementation of the method and apparatus includes employing ink having two or more electroluminescent pattern layers with an input device. Based on the context of a computer associated with the input device, an illuminated pattern identifies the current functionality of one or more of the inputs of the input device.

19 Claims, 6 Drawing Sheets

Layer 1

Layer 2

CONTEXT SENSITIVE LABELS FOR A HARDWARE INPUT DEVICE

CROSS REFERENCE TO RELATED APPLICATION

This application is a continuation of prior U.S. application Ser. No. 10/630,937, filed Jul. 31, 2003, now U.S. Pat. No. 7,133,030, the entire contents of which is incorporated herein by reference.

FIELD OF THE INVENTION

The present invention generally relates to a computer input device in which the functions of the input device change based on a particular state or active application. More particularly, the invention relates to a hardware input device for a computer having context sensitive labels that identify a function associated with the device that can change based on, for example, the application running on the computer.

BACKGROUND

In today's computer systems, multiple applications with varying functionality are available to a user. Some of the functionality and functions found in one application are not found in every other application. In the early days of the personal computer, control and function keys were added to the standard QWERTY keyboard to provide additional functionality. The function keys, typically arranged in a line across the top of the keyboard, could be assigned specific commands by the current application or the operating system. Control keys provided cursor and screen control. The control keys allowed the user to make large jumps in most applications. Common control keys include: Home, End, Insert, Delete, Page Up, Page Down, Control (Ctrl), Alternate (Alt), and Escape (Esc).

As more and more functionality and applications have come on line, further keys have been added to keyboards. Some keyboards adapted to operate with the Microsoft Windows® operating system include some extra control keys: two Windows® or Start Keys and an Application Key. As more keys have been added to a keyboard, it has become increasingly difficult for a user to remember the specific functionality assigned to each key or combination of keys, much less find the keys providing a particular functionality. This can be particularly confusing when the functionality of a key changes from one application to another.

The functionality of a key and a key combination has been placed on the keys themselves in the form of text labels or graphic symbols. In some applications, such as Microsoft Word®, functionality associated with certain key combinations is not identified on the keys themselves. With those key combinations, to determine their functionality a user can press the key combination or through the Tools menu access a customize tool, followed by selecting keyboard. By navigating through a list of functions, a user can see which function is assigned to what key or key combination. Also, a user may assign a shortcut for a function to a key or key combination, so-called "hot keys", resulting in a user-customizable keyboard. The user may set the function assigned to a hot key such that subsequent pressing of the hot key causes the desired function to be performed. Not surprisingly, many users do not take advantage of conventional hot keys because it is inconvenient to assign the functions to the keys, or because they may not even appreciate that such a capability exists. Even when hot keys are programmed, the user may have difficulty in recalling which function is assigned to each hot key. This is especially true when there are multiple hot keys on a keyboard.

Another prior art solution involves providing flip chart above keys as labels to identify the functions assigned to keys or key combinations for different applications.

Generally speaking, a keyboard has a limited number of keys for receiving user input commands. To account for the limited number of keys, certain keystroke commands can perform different functions from one application to another. However, it can be difficult for the user to remember which keys have what functionality at any given time and requiring a user to search through menus in the application to determine the functionality of various key and key combinations can be cumbersome. Consequently, there is a need to make it simpler for a user to understand the functionality for key input commands in a respective application.

Another consideration in improving a user's understanding of various key input commands is to do so without a substantial increase in cost of the keyboard. With input devices such as a keyboard, there is a need to provide an input device that is flexible, inexpensive and can be utilized with relative ease with applications supported by a computer.

SUMMARY

Aspects of the present invention relate to methods for morphing hardware input devices based on the active context and such changeable hardware input devices. An illustrative morphing method involves automatically changing text labels on an input device, such as the keys on a keyboard, depending on a current context, such as the active application.

Aspects of the invention relieve users of having to memorize shortcuts or navigate through menus to find the key inputs that define a desired command. In certain aspects of the invention, a mechanically and/or optically reconfigurable keyboard is provided. Other aspects allow a context-based label associated with a key to be displayed while other labels associated with other contexts of the key can be hidden. The context-based label can represent the functionality of the key in the current context. In certain aspects of the invention, a user can be provided with a more tangible interface that presents only relevant actions. According to aspects of the invention, only information relevant to operation of the key, keys or keyboard is presented to the user. By presenting more custom and specific information, the keyboard layout can communicate the functionality available in an application and reduce the learning curve for users.

In one aspect of the invention, a method is provided for labeling a key on a hardware input device, wherein a plurality of pattern layers are associated with a key, the pattern layers being disposed on top of each key. The method may be a computer-implemented process. In one further aspect, the steps of the method include receiving a first control signal from a computer in a first context, displaying at least a portion of the first pattern layer responsive to the first control signal in the first context, receiving a second control signal from the computer in a second context, and displaying at least a portion of the second pattern layer responsive to the second control signal in the second context. In still further aspects the label can represent an icon, a character, text, or the like. In other aspects, the current context may correspond to an application in focus on the computer or an active language.

In another further aspect the step of displaying at least the portion of the first pattern layer can include illuminating at least the portion of the first pattern layer, and the step of displaying at least the portion of the second pattern layer can include illuminating at least the portion of the second pattern layer. In yet other aspects the pattern layers may be part of a key or adjacent to an associated key. The pattern layers may be electroluminescent.

In another aspect of the invention, a method for labeling a key on a keyboard is provided that includes the steps of receiving a control signal from a computer representing a current context, and moving a template automatically in the keyboard so that the label corresponding to the current context is displayed in a region adjacent to the key. In further aspects of the method, the template may be drum-shaped, octagonal or any other shape that would fit within the contour of a keyboard.

According to another aspect of the invention, a hardware input device for a computer is provided including a plurality of input keys, at least one key being associated with a plurality of labels, each label representing a context associated with the key, wherein a label displayed is configured to change in response to a control signal representing a current context generated by the computer. In certain aspects the labels can represent characters in different languages. In further aspects, the input device can include a plurality of stacked layers configured to display the label representing the context of the key responsive to the control signal. In certain aspects the stacked layers may be electroluminescent pattern layers, liquid crystal display layers, or organic light emitting diode (OLED) layers. In yet further aspects the stacked pattern layers can be in a region adjacent to the key or part of the key. In an aspect incorporating electroluminescent layers as part of the key, these layers may be located at the top of the key or at the bottom of the key in the key substrate. If the layers are located at the bottom portion, in a yet a further aspect, the key may further include a transparent top portion and optical components disposed between the transparent top portion and the stacked electroluminescent pattern layers. The optical components project a display of the label representing the context of the key from the electroluminescent pattern layers through the transparent top portion.

In a further aspect, instead of pattern layers, a layer of electronic ink could be used where responsive to a control signal, the layer of electronic ink is configured to change and display a label representing the context of a key on a keyboard.

In another aspect of the present invention, a keyboard is provided including a configurable substrate, wherein responsive to a control signal representing a current context, the substrate changes topography to generate a user interface. In a further aspect, the keyboard includes labels representing various contexts associated with the user interface, wherein at least one label is configured to be displayed responsive to the control signal representing the current context of the user interface.

In yet another aspect of the present invention, the keyboard includes a plurality of keys, each key associated with a region for displaying a current context for the key, a driver for receiving a control signal from a computer and generating a signal for associating the current context with each key, and a movable template configured to display the current context of each key in the region associated with each key responsive to a signal received from the driver.

These and other novel advantages, details, embodiments, features and aspects of the present invention will be apparent to those skilled in the art from following the detailed description of the invention, the attached claims and accompanying drawings, listed herein, which are useful in explaining the invention.

BRIEF DESCRIPTION OF THE DRAWINGS

The foregoing summary, as well as the following detailed description of illustrative embodiments, is better understood when read in conjunction with the accompanying drawings, which are included by way of example, and not by way of limitation with regard to the claimed invention.

DETAILED DESCRIPTION

As described above, aspects of the present invention relate to a method and apparatus that allows a user to easily identify functionality assigned to keys/buttons on an input device. The method is particularly applicable to keyboard input devices, but may be applied to other hardware input devices as appropriate. The keyboard can be a separate unit for interfacing with a host computer or integrated with a computer system, such as integrated with a personal computer or handheld computer system.

Figure 1:
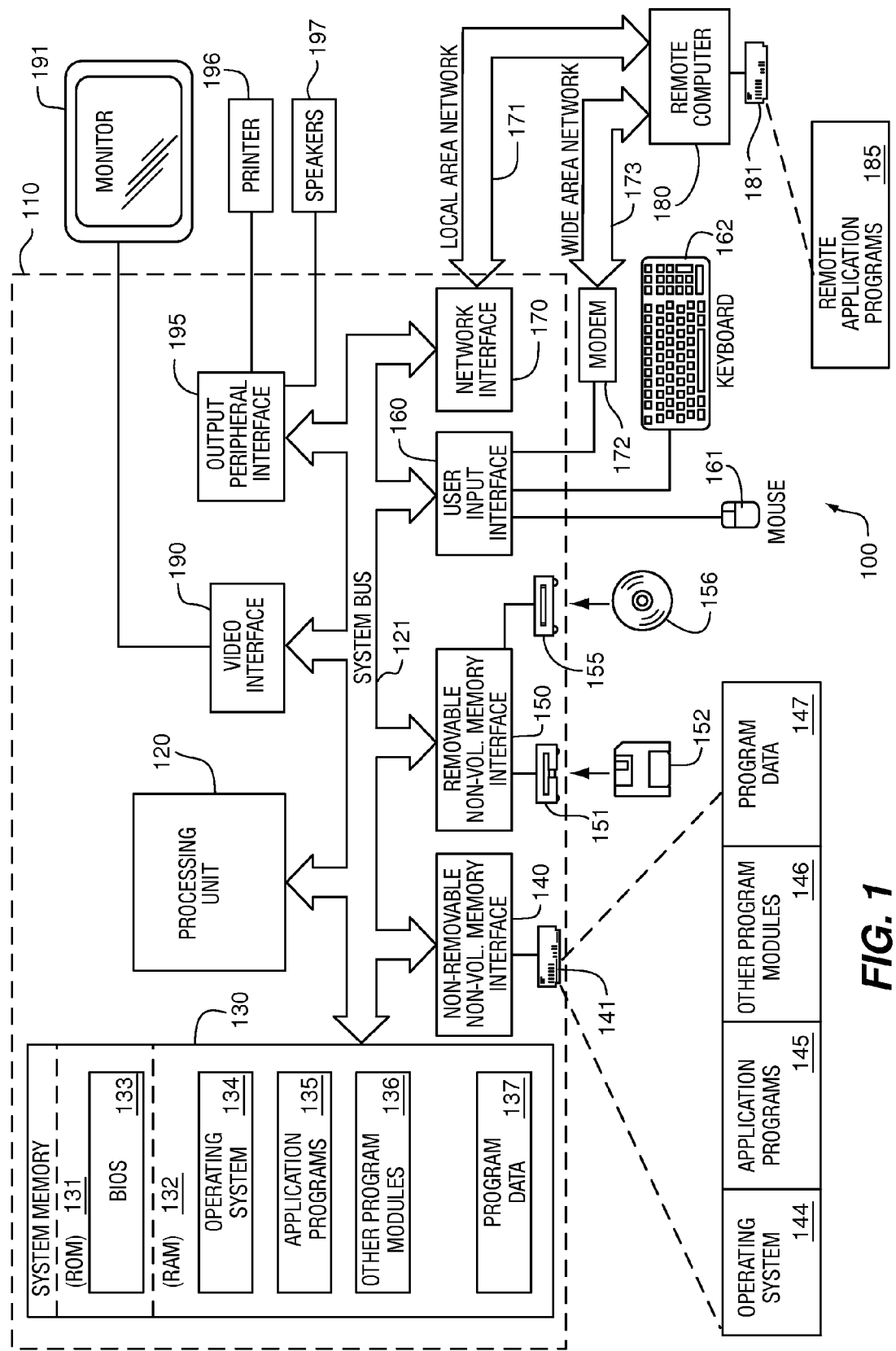
FIG. 1 shows a schematic diagram of a general-purpose digital computing environment that can be used to implement various aspects of the invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181.

It will be appreciated that the network connections shown are exemplary and other means of establishing a communications link between the computers may be used.

An input device such as a keyboard 162 allows a user to provide input to a computer 110. It would be helpful if a keyboard were more flexible to simplify the user experience. This is particularly true where a user has to memorize shortcuts or navigate through a series of menus to find the desired command. In certain embodiments of the invention, a keyboard can be mechanically and/or optically reconfigured. According to certain implementations of the invention, keys can be labeled according to the context of the computer to represent their functionality.

One possible method for providing keys with the ability to communicate their functionality would involve providing a pixel addressable display on top of each key. Hence, a potentially infinite number of key labels could be configured for each key. While such a concept is within the scope of the invention, providing a pixel addressable display for each key is not, as of yet, cost-effective. Other less expensive alternatives can be implemented.

In one illustrative embodiment, the present invention incorporates electroluminescent ink. Electroluminescent ink has been employed in other applications such as indiglo for watches and to provide backlighting for devices such as mobile phones. According to an exemplary implementation of the invention, electroluminescent ink can be layered with different patterns, such as text labels, provided one on top of another where the pattern on the bottom layer shines through the pattern on the top layer. With this concept, text labels on keys, such as variable function keys, can be changed automatically according to the application running and the function assigned to the key. Also, the labels can occupy the same space on the top of the key. In another embodiment, the labels can be placed in a region adjacent to the key rather than on top of the key.

In more detail, according to an exemplary embodiment of the invention, two or more electroluminescent ink pattern layers are stacked on top of each other in or adjacent to a key. By layering, different ink patterns can be placed one on top of another, where the bottom pattern layer can shine through the top pattern layer for viewing. Each pattern layer is very thin and, responsive to a high voltage, energizes phosphor atoms that produce light. Each pattern layer could be a laminated assembly including a thin glass or plastic substrate such as Mylar® developed by E.I. du Pont de Nemours and Company of Wilmington, Del., which is coated with a clear conductor, which in turn is coated with a thin layer of phosphor. The phosphor can be coated with a thin plastic and then another electrode can be provided. Essentially a capacitor can be created with phosphor between two conductors. When a voltage, such as 100 to 200 volts AC, is applied to the capacitor, the phosphor energizes and begins emitting photons in the visible spectrum. The photons provide an illuminated pattern corresponding to the layout of the phosphor region and are readily visible to the naked eye.

Figure 2:
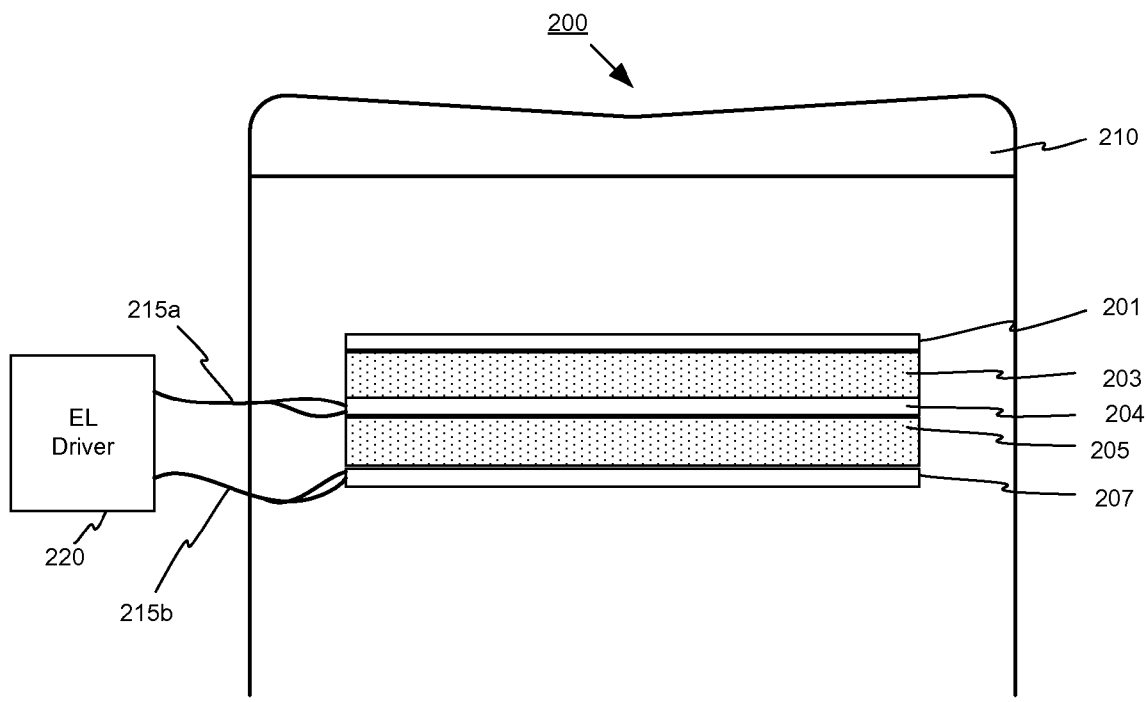
FIG. 2 shows a side view of a key according to an illustrative implementation of the present invention.

With reference to FIG. 2, a discussion of a configuration of a key according to an exemplary embodiment is described below. FIG. 2 shows a side view of an illustrative key 200 with two stacked pattern layers. It will be apparent to those skilled in the art that additional pattern layers could be provided. For ease of description, however, an implementation with two pattern layers will be described with reference to FIG. 2. The key 200 includes a clear key cap 210, and first and second pattern layers. The key cap 210 can be made of a clear substance, such as a clear black plastic like Mylar® developed by E.I. du Pont de Nemours and Company of Wilmington, Del., that allows light to pass through. The pattern layer structure includes a top Mylar® layer 201, a first electroluminescent (EL) ink print layer 203, a first Mylar® substrate 204, a second EL ink print layer 205, and a second Mylar® substrate 207. At the bottom of the substrate 207 there may be a backing that can reflect any backscatter through the transparent substrates toward the top of the key. Electrical connections 215$a$ and 215$b$ are provided between the EL (electroluminescent) driver 220 and the Mylar® substrates 204 and 207, respectively. The EL driver 220 provides a signal to the pattern layers via the electrical connections 215$a$ and 215$b$ to excite the appropriate electroluminescent layer 204 or 207.

The EL driver 220 receives a control signal from a computer according to a current context operative at the computer. The control signal identifies the appropriate label or labels that correspond to the current context of the computer. In one implementation, a group of labels correspond to a command set associated with a particular application, such as a word processing or mail application. Responsive to receiving the control signal from the computer, the EL driver 220 generates a signal that causes the proper contextual labels to be active. That is, a current is transmitted to the pattern layer with the corresponding label causing the phosphors to energize and display the pattern represented by the phosphors. It will be appreciated that the EL driver 220 may actually include a series of drivers. In addition, the EL driver can continually transmit a signal to the desired pattern layer to activate the desired label for as long as necessary, for example as long as the current context remains the same. Each pattern layer 203 and 205 acts as a separate circuit, which illuminates when active, namely when EL driver 220 provides a current to the respective substrate 204 or 207 associated with the pattern layer.

It should be understood that the voltage required to drive the electroluminescent pattern layer in order to receive an acceptable output may need to be increased for pattern layers farther away from the key cap 210 so that an appropriate light output (intensity) can be generated such that the user can see the label associated with the current functionality of the key.

Labels can be constructed by the patterns of the phosphors in the EL ink print layers 203 and 205. For example, the label can be patterned or printed to take the form of text or an icon or any other graphical representation. It is well within the knowledge of the skilled artisan to design the appropriate pattern.

From a practical standpoint, a limited number of pattern layers can be stacked on top of each other due to several factors including available space and the voltage requirements necessary to generate the appropriate intensity of light to penetrate through layers above the lower layer for visible recognition of a label by a user. Thus, a lower pattern layer would require a higher current to provide the user of the key with the same apparent intensity of light as the layer nearest to the top, e.g., nearest to the key cap 210.

Figure 3:
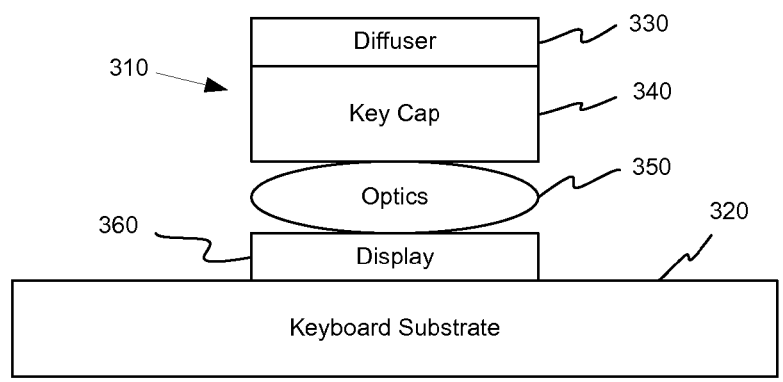
FIG. 3 shows a key on a keyboard substrate according to an illustrative embodiment of the present invention.

Ideally, the pattern layers would light at the top of each key as described with reference to FIG. 2. While techniques exist for placing the display at the top of each key such as making part of the key conductive to transmit the power and signal, such techniques may be difficult and costly. An alternative embodiment involves placing the display at the bottom of the key's substrate and then using optics and to diffuse through clear top keys. In this embodiment, the phosphorescent display from an illuminated pattern layer can be projected to the top of the key cap. An illustrative structure for implementing this embodiment including the key 310 and keyboard substrate 320 is depicted in FIG. 3. As shown in FIG. 3, the key 310 is coupled to the substrate 320. From top to bottom, the key includes diffuser 330, key cap 340, optics (e.g., mirrors and the like) 350 and the display 360.

Figure 4:
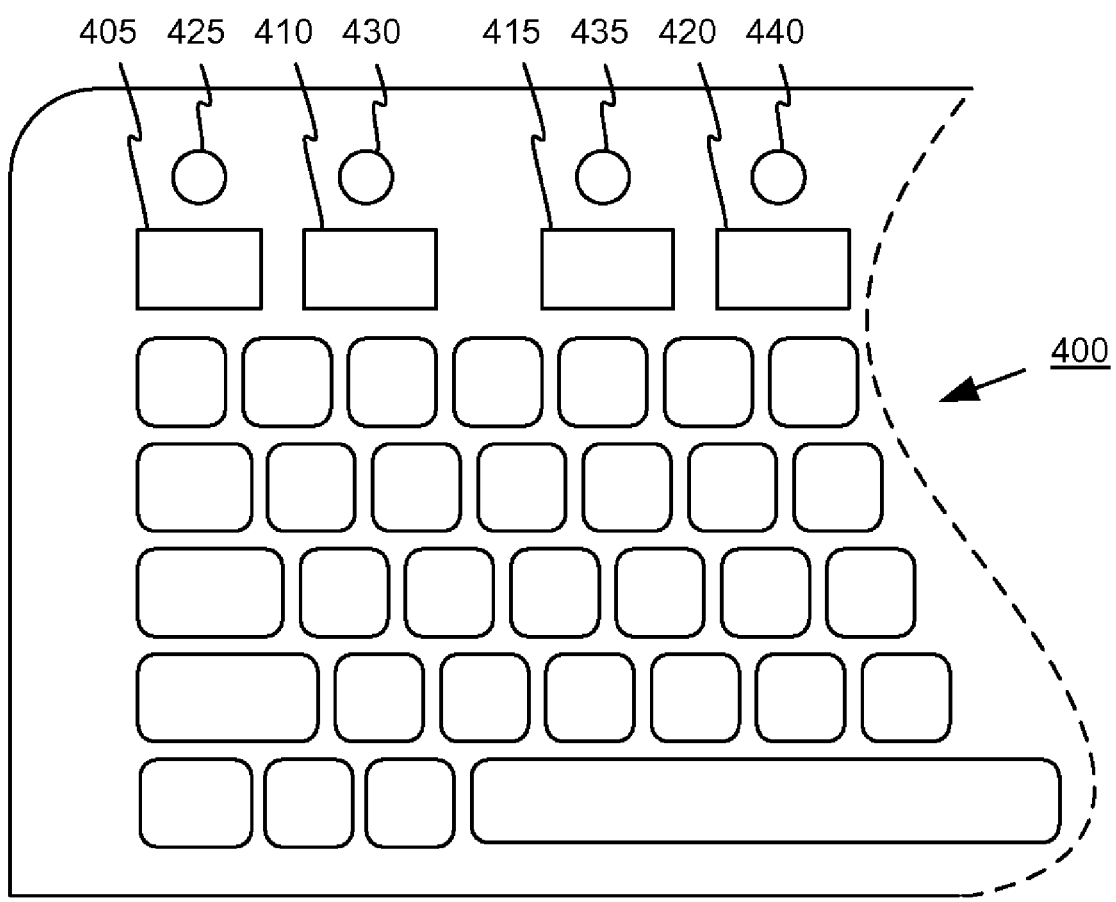
FIG. 4 shows a portion of a keyboard according to an illustrative implementation of the present invention.

In another illustrative implementation of the invention depicted in FIG. 4, the pattern layers could be placed in a region adjacent to the key. FIG. 4 shows a keyboard 400 including the conventional keyboard keys and function keys. On the top portion of the keyboard, four buttons are shown 405, 410, 415 and 420. Below each of the buttons 405, 410, 415, 420 is an electroluminescent strip (label region) 425, 430, 435, 440. The label regions respectively display the pattern layer associated with the current context of the corresponding key.

Figure 5:
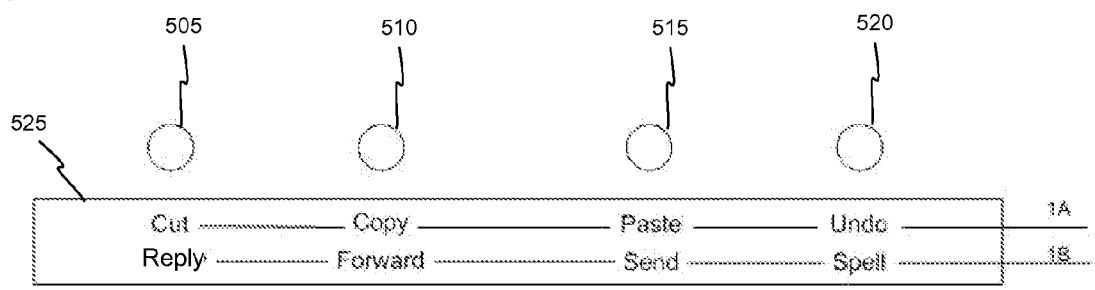
FIG. 5 shows a configuration of assigning various command sets to a plurality of keys according to an exemplary implementation of the present invention.
Figure 5:
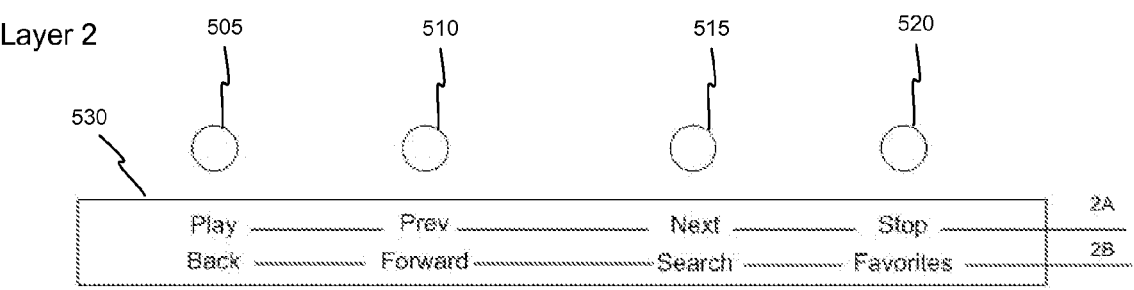

In another illustrative implementation of the present invention, each layer could have two separate electroluminescent patterns representing labels, which could be controlled independently. Thus, if two pattern layers are stacked one on the other, then four separate contexts could be represented by the available patterns. Stated differently, four separate command sets could be represented. FIG. 5 shows an illustrative implementation of two layers, each with two patterns.

Referring to FIG. 5, elements 505, 510, 515 and 520 represent keys. Layer 1 525 includes two separate command sets 1A and 1B. Command set 1A provides the context for the keys 505, 510, 515 and 520 in a word processing application. As shown, keys 505, 510, 515 and 520 have the functions of Cut, Copy, Paste and Undo, respectively for the word processing application context. Command set 1B provides the context in a mail or messaging application. As shown, keys 505, 510, 515 and 520 have the functions Reply, Forward, Send and Spell, respectively for the mail application context. In this embodiment, when either the word processing or mail application is active then the EL Driver illuminates the corresponding command set 1A or 1B in layer 1 525.

Layer 2 530 includes two separate command sets 2A and 2B. Command set 2A provides the context for the keys 505, 510, 515 and 520 in a media application. As shown, keys 505, 510, 515 and 520 have the functions of Play, Prev, Next and Stop, respectively for the media application context. Command set 2B provides the context in an Internet browser application. As shown, keys 505, 510, 515 and 520 have the functions Back, Forward, Search and Favorites, respectively for the browser application context. In this embodiment, when either the media or browser application is active then the EL driver illuminates the corresponding command set 2A or 2B in layer 2 530. Also, in place of one of the command sets 1A, 1B, 2A and 2B, the keys could have a default command set which is used in other applications.

It should be understood that even though the embodiment of FIG. 5 is discussed with respect to one label appearing for each key at a time, that multiple labels could be shown. For example, different portions of the label could correspond to different key strokes, such as the key only, key+shift, key+control, key+alt. Further, as appropriate the labels in this implementation need not all be part of the same layer as long as they are not overlapping such that one label would block another. In an exemplary implementation, patterns could be formed by combinations of labels from different layers as along as the portions do no not overlap. For example, a top layer label could be a dash, a lower layer could be a circle and the combination could be a circle with a dash through the middle.

The aforementioned implementations provide a mechanism to identify a set of functional labels, one of which can automatically be highlighted for a key in a current context.

Other illustrative implementations of the invention include stacking preprinted liquid crystal displays (LCDs) on top of each other adjacent to a key or within the key. Electroluminescent backlighting can be used. An LCD driver in place of an EL driver would receive a control signal from a computer representing a current context associated with the computer. In turn, the LCD driver would activate the LCD corresponding to the current context. One skilled in the art of liquid crystal displays would be able to easily construct a stacked liquid crystal display to carry out the invention. To provide proper lighting for a second layer, one skilled in the art would appreciate that it may be necessary to provide good ambient light, in the case of a reflective LCD or a bright light source underneath the layers.

In still another illustrative implementation, stacked layers of organic light emitting diodes (OLEDs) could be used. Unlike traditional LCDs, OLEDs are self-luminous and do not require backlighting, diffusers, or polarizers that go with LCDs. An OLED includes two charged electrodes sandwiched on top of some organic light emitting material. Their low power consumption provides for increased efficiency and helps minimize heat and electric interference. The basic OLED cell structure includes a stack of thin organic layers sandwiched between a transparent anode and a metallic cathode. The organic layers comprise a hole-injection layer, a hole-transport layer, an emissive layer, and an electron-transport layer. When an appropriate voltage is applied to the cell, the injected positive and negative charges recombine in the emissive layer to produce light (electro luminescence). The structure of the organic layers and the choice of anode and cathode are designed to maximize the recombination process in the emissive layer, thus maximizing the light output from the OLED device. To implement an OLED in the invention, an OLED driver in place of an EL driver would receive a control signal from a computer representing a current context associated with the computer. In turn, the OLED driver would activate the OLED corresponding to the current context. One skilled in the art of OLEDs would be able to easily construct a stacked OLED display to carry out the invention.

In still a further implementation, rather than pattern layers, a layer of electronic ink may be used such that the electronic ink would change in response to a control signal to display a label representing the current context of a key on a keyboard. The principal components of electronic ink are millions of tiny microcapsules, about the diameter of a human hair. In one incarnation, each microcapsule contains positively charged white particles and negatively charged black particles suspended in a clear fluid. When a negative electric field is applied, the white particles move to the top of the microcapsule where they become visible to the user. This makes the surface appear white at that spot. At the same time, an opposite electric field pulls the black particles to the bottom of the microcapsules where they are hidden. By reversing this process, the black particles appear at the top of the capsule, which now makes the surface appear dark at that spot. To form an electronic ink display, the ink can be printed onto a sheet of plastic film that is laminated to a layer of circuitry. The circuitry forms a pattern of pixels that can then be controlled by a display driver. To implement electronic ink in the invention, an electronic ink display driver in place of an EL driver would receive a control signal from a computer representing a current context associated with the computer. In turn, the electronic ink display driver would cause the appropriate pixels on the electronic ink display to be black and white to provide an electronic ink pattern corresponding to the current context.

In yet another implementation of labeling a key on a keyboard, the keys each have a window area adjacent to the key where a physical label can be displayed. For example, in place of EL strips 405, 410, 415 and 420 in FIG. 4, respective window areas can be provided. Responsive to a control signal representing a current context from a computer or processor, a mechanical motorized roller moves a sliding template within the window area so that the appropriate label identifying the key functionality in the current context shows in the window. A physical template can be used to represent a command set for keys positioned in a row or a column. In another embodiment, the physical template may be a drum, similar to a slot machine such that the labels for a key's functionality in different contexts are printed on the drum. Responsive to a control signal from the computer or processor, the drum rotates to display the appropriate label for the current context in the window. Alternatively, the template may be octagonal or any other shape that would fit within the contour of a keyboard In another illustrative embodiment, rather than only a few keys having their labels change dependent on the current context, the entire keyboard can be morphable based on the current context. For example, the key labels could change based on the active language. Thus, the keys on a keyboard could change to represent Japanese characters responsive to a control signal indicating that the active language is Japanese, or could include characters with accents and the like for certain Latin-based languages. In such an implementation, when an active application or the operating system is in a particular language, the keyboard can automatically be configured to provide labels representing the characters in that application. Such a keyboard could be very advantageous in that there would be no need to manufacture different keyboards for different countries. Instead, a universal keyboard could be made according to the invention which can be automatically configured to provide the language desired. Also, a user could manually configure the keyboard for a particular language through the set up in the computer so that multilingual users would be presented with labels for characters/functions in the active language. In an alternate implementation, a button could be provided on the keyboard, which could be manipulated to provide the desired language. Through the above-described methods the language context could be combined with the functionality context so that the labels could be adapted to display the appropriate language and functionality for a key.

Figure 6:
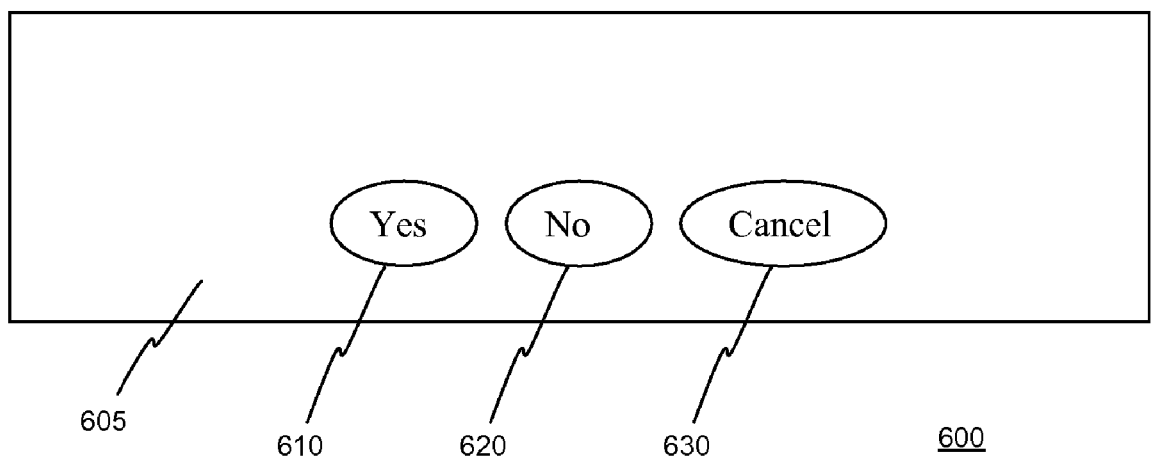
FIG. 6 shows a keyboard according to another exemplary implementation of the present invention.

In another embodiment of the invention, the context sensitive aspects of the invention can be taken to another level such that the mechanics of the keys are themselves configurable. According to this implementation, a flat keyboard is presented to the user. In response to a control signal from a computer representing the current context, the keyboard substrate could physically grow out of the flat keyboard in dimple form to represent a key. Hence, the topography of the keyboard substrate changes. The dimples reside on top of a display that provides the functionality of the dimple/key. This aspect of the invention provides a reconfigurable keyboard, where if there are only three choices available for a user to take in the current context, such as Yes, No or Cancel then only those keys/dimples appear to the user. Referring to FIG. 6, the keyboard 600 includes a keyboard substrate 605 and three raised portions 610, 620 and 630, which encompass the only functionality presently available in the active application. Depression of any of the raised portions would cause the functionality represented by the portion to occur. The benefit of this embodiment is apparent in that only the keys that are relevant to the current context will appear. Hence, in a word processing application, the QWERTY key layout will be presented to the user, whereas in a drawing application with no text entry the QWERTY layout will not be provided. Instead, more specific application buttons appear like line, circle, etc.

To implement an illustrative embodiment, one skilled in the art could build the morphing mechanical device applying the teachings and principles of the electronic Braille technology employed by Virtouch, Ltd. of Jerusalem, Israel described in U.S. Pat. No. 5,912,660 entitled "Mouse-like Input/Output Device with Display Screen and Method For its Use" and U.S. Pat. No. 6,278,441 entitled "Tactile Interface System For Electronic Data Display System." In particular, pins can be provided in the keyboard substrate and responsive to a control signal representing the current context can be raised and lowered to identify the appropriate keys/dimples available to receive an input in the current context. The areas raised by the pins would have underlying keys such that the functionality associated with the raised areas would occur responsive to depression of the raised area. The pins can be combined with the labeling technology described above to provide a visual identification of the functionality of the raised dimples/keys.

In one implementation of the present invention, software to trigger the labeling of the hardware input device resides on the computer. For example, an application or hook running in the operating system monitors the application in focus and sends control signals to the hardware input device control element, e.g., EL driver for the embodiment described with respect to FIG. 2, representative of the current context. It should be understood that many methods of implementing the present invention including the above-described methods could be implemented using computer-executable instructions, which can be stored on a computer readable medium.

Figure 7:
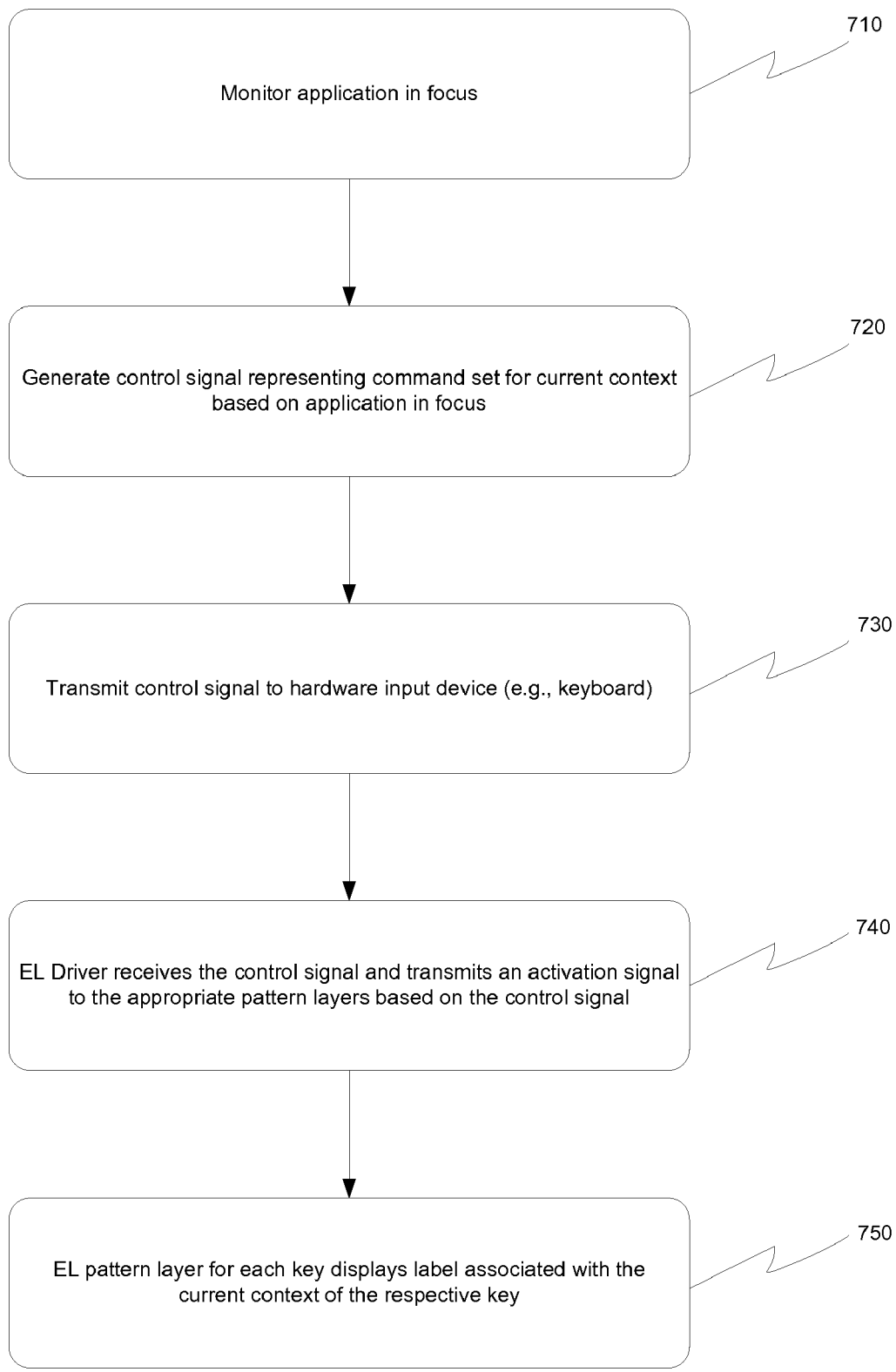
FIG. 7 shows a flowchart illustrating the steps to label the keys based on a current context according to an exemplary implementation of the present invention.

FIG. 7 shows a flowchart illustrating the steps to label the keys based on a current context according to an exemplary implementation of the present invention, which can operate in conjunction with the input device described in FIG. 4. In step 710, the software monitors the application currently in focus. Based on the application in focus, the software generates a control signal representing a command set for the current context in step 720. In one embodiment, the control signal is an operating system message as to what application is running. Then, in step 730, the software causes the control signal to be transmitted from the computer/processor to the hardware input device (e.g., keyboard). The hardware input device may be external to the computer or integrated with the computer. Next in step 740, the hardware driver (e.g., EL driver) receives the control signal from the computer and transmits an activation signal to the appropriate pattern layer for each key impacted by the change in context based on the control signal. The hardware driver may include a look up table or other memory to convert the control signal to an appropriate activation signal. Responsive to the control signal, in step 750 the EL pattern layer for each key emits light in the form of a pattern representing a viewable label associated with the current context of the respective key for the application in focus. Also, in step 750, signals previously generated responsive to a previous context, including a default context causing other labels to be displayed, are discontinued in response to the control signal. As discussed previously, the context is not limited to what application is in focus, but can include other contextual situations like language of operating system/application.

Various examples of the present invention have been described above, and it will be understood by those of ordinary skill that the present invention includes within its scope all combinations and subcombinations of these examples. Additionally, those skilled in the art will recognize that the above examples simply exemplify the invention. Various changes and modifications may be made without departing from the spirit and scope of the invention, as defined in the appended claims.

The invention claimed is:

1. A method for labeling a key on a hardware input device, wherein a plurality of pattern layers are associated with a key, one of first and second pattern layers being disposed on top of the other of the first and second pattern layers, and the first pattern layer being divided into first and second portions, said method comprising the steps of:
    receiving a first control signal from a computer in a first application context;
    displaying the first portion, and not the second portion, of the first pattern layer responsive to the first control signal in the first application context;
    receiving a second control signal from the computer in a second application context;
    displaying at least a portion of the second pattern layer responsive to the second control signal in the second application context;
    receiving a third control signal from the computer in a third application context; and
    displaying the second potion, and not the first portion, of the first pattern layer responsive to the third control signal in the third application context.

2. The method according to claim 1, further including responsive to the third control signal, discontinuing the display of any portions of the first and second pattern layers displayed when receiving the third control signal.

3. The method according to claim 1, wherein the first and second portions are mutually exclusive.

4. The method according to claim 1, wherein the first control signal represents an application that is in focus.

5. The method according to claim 1, wherein the first portion of the first pattern layer includes text representing a function associated with the key in an active application in the first context.

6. The method according to claim 5, wherein the second portion of the first pattern layer includes text representing a function associated with the key in an active application in the third application context.

7. The method according to claim 5, further comprising the step of discontinuing the display of the first portion of the first pattern layer responsive to the third control signal in the third application context.

8. The method according to claim 1, wherein the first portion of the first pattern layer includes an icon representing a function associated with the key in an active application in the first application context.

9. The method according to claim 1, wherein the first and second pattern layers are in a region adjacent to the key.

10. The method according to claim 1, wherein the first and second pattern layers are part of the key.

11. The method according to claim 1, further comprising the step of responsive to the second control signal in the second application context discontinuing the display of any portion of the first pattern layer displayed when receiving the second control signal.

12. The computer readable storage medium according to claim 1, wherein the first and second pattern layers are electroluminescent.

13. A method for labeling a key on a hardware input device, wherein a plurality of pattern layers are associated with a key, one of first and second pattern layers being disposed on top of the other of the first and second pattern layers and the first pattern layer being divded into first and second portions, said method comprising the steps of:
    receiving a first control signal from a computer in a first application context;
    displaying a first portion, and not a second portion, of the first pattern layer responsive to the first control signal in the first application context;
    receiving a second control signal from the computer in a second application context;
    displaying at least a portion of the second pattern layer responsive to the second control signal in the second application context;
    receiving a third control signal from the computer in a third application context; and
    displaying the second portion, and not the first portion, of the first pattern layer responsive to the third control signal in the third application context, wherein the first and second pattern layers are electroluminescent.

14. A computer readable storage medium having computer-executable instructions for performing the steps of:
    determining a current application context of a computer;
    generating a control signal representing the current application context; and
    transmitting the control signal to a keyboard, the control signal causing one of first and second portions of one of a plurality of stacked layers associated with a key of the keyboard to be illuminated, wherein the illuminated one of the first portion and the second portion of the stacked layer displays the current application context of the key and when one of the first portion and the second portion of the stacked layer is illuminated the other one of the first portion and the second portion of the stacked layer is not illuminated,
    wherein the stacked layers are electroluminescent.

15. The computer-readable storage medium of claim 14, wherein the current application context represents a language.

16. The computer readable storage medium according to claim 14, wherein the current application context represents an application in focus.

17. The computer readable storage medium according to claim 14, wherein the illuminated one of the first portion and the second portion of the stacked layer includes text representing a function associated with the key in an active application in the current application context.

18. The computer readable storage medium according to claim 14, wherein the illuminated one of the first portion and the second portion of the stacked layer includes an icon representing a function associated with the key in an active application in the current application context.

19. The computer readable storage medium according to claim 14, wherein one of the first and second portions of the stacked layer illuminated represents a character in a first language, and the other one of the first and second portions of the stacked layer illuminated represents a character in a second language.

* * * * *

UNITED STATES PATENT AND TRADEMARK OFFICE
CERTIFICATE OF CORRECTION

PATENT NO.        : 7,403,190 B2
APPLICATION NO.   : 11/556409
DATED             : July 22, 2008
INVENTOR(S)       : Steven N. Bathiche It is certified that error appears in the above-identified patent and that said Letters Patent is hereby corrected as shown below:

In column 13, line 23, in Claim 1, delete "potion," and insert -- portion, --, therefor.

In column 14, line 5, in Claim 13, delete "divded" and insert -- divided --, therefor.

Signed and Sealed this

Nineteenth Day of April, 2011

David J. Kappos
*Director of the United States Patent and Trademark Office*